Oct. 11, 1966
K. F. POTTER ETAL
3,278,045
COUNTERWEIGHT SUPPORT MECHANISM
Filed March 9, 1964
6 Sheets-Sheet 3
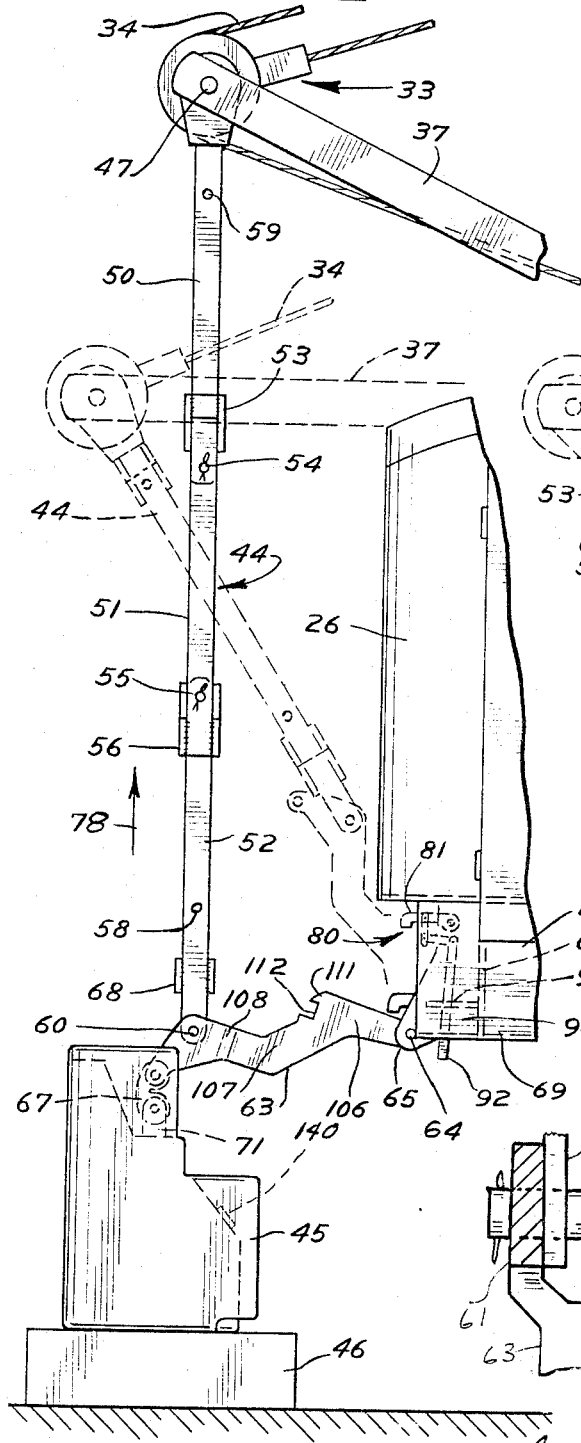
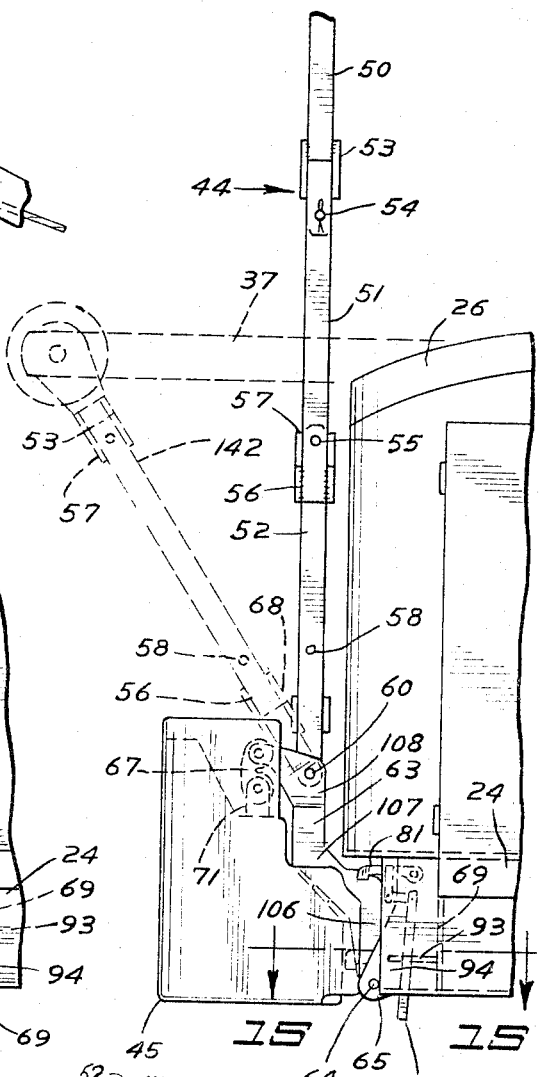
INVENTORS
KENNETH F. POTTER
ARCHER W. BROWN
BY JAMES L. MONTGOMERY
Dugger Braddock Johnson & Westman
ATTORNEYS

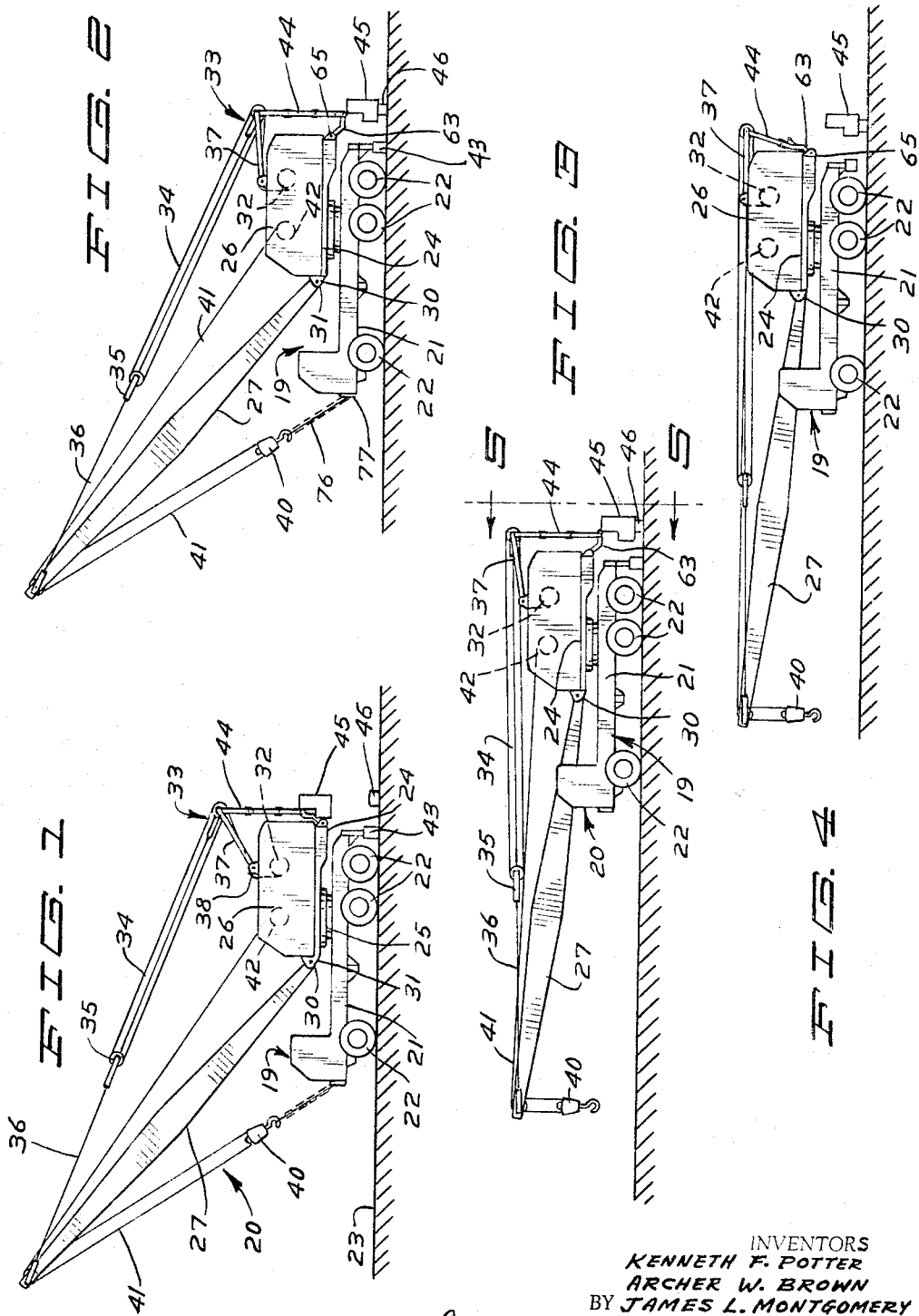

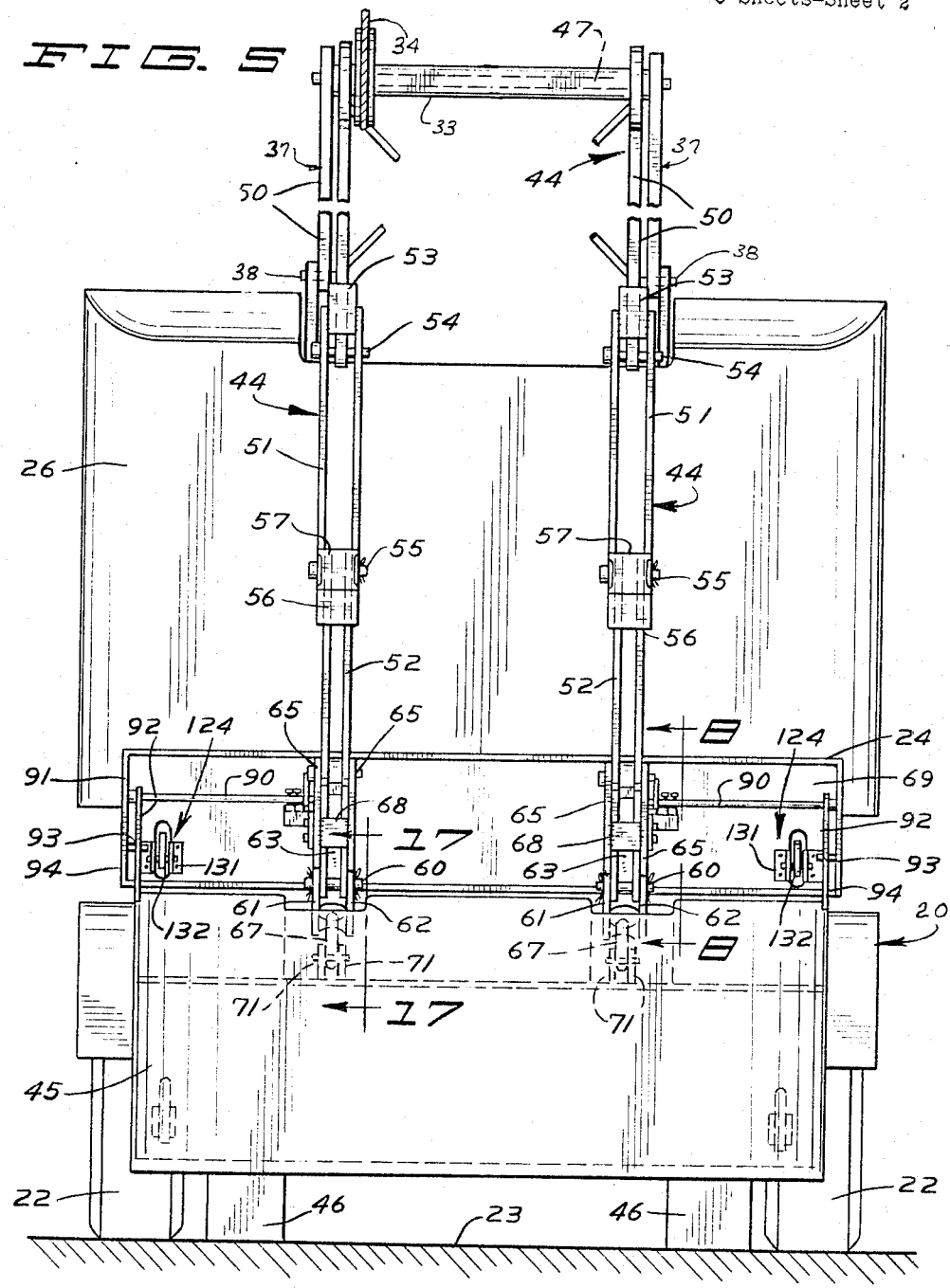

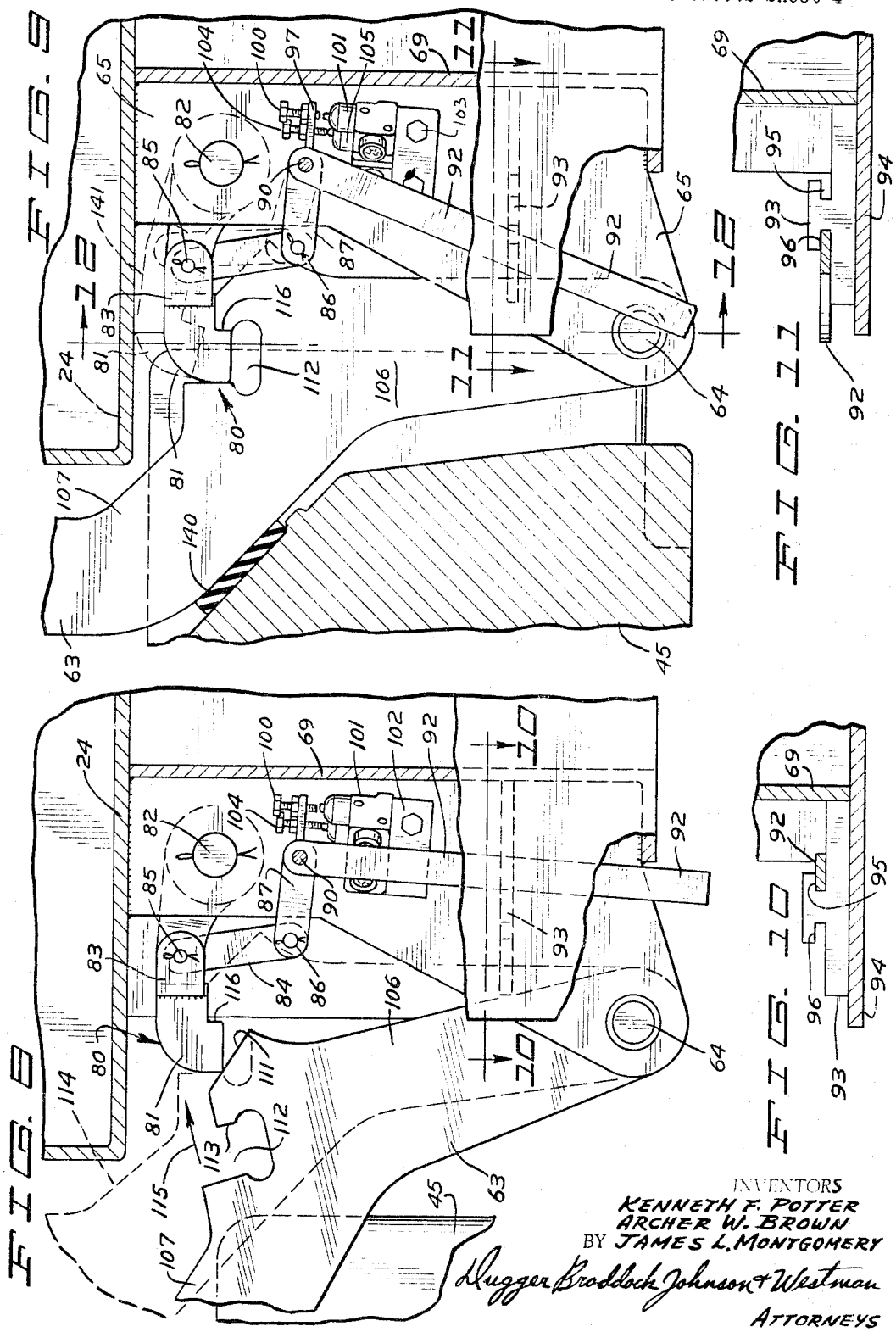

Oct. 11, 1966  K. F. POTTER ETAL  3,278,045
COUNTERWEIGHT SUPPORT MECHANISM
Filed March 9, 1964  6 Sheets-Sheet 5

INVENTORS
KENNETH F. POTTER
ARCHER W. BROWN
BY JAMES L. MONTGOMERY
Dugger Braddock Johnson & Westman
ATTORNEYS

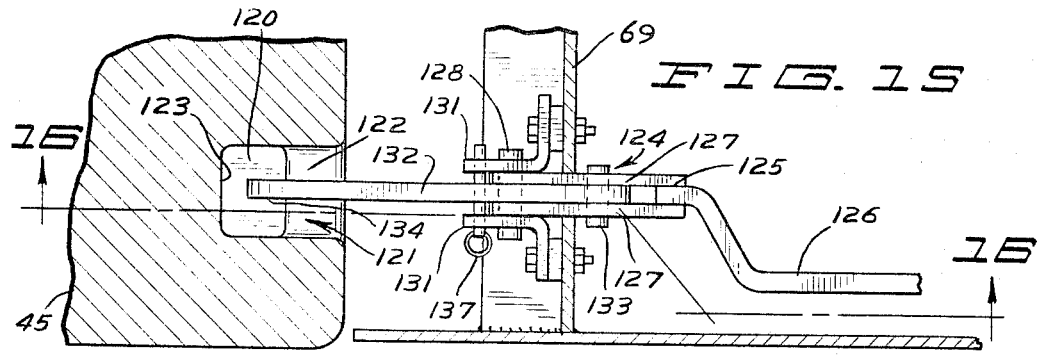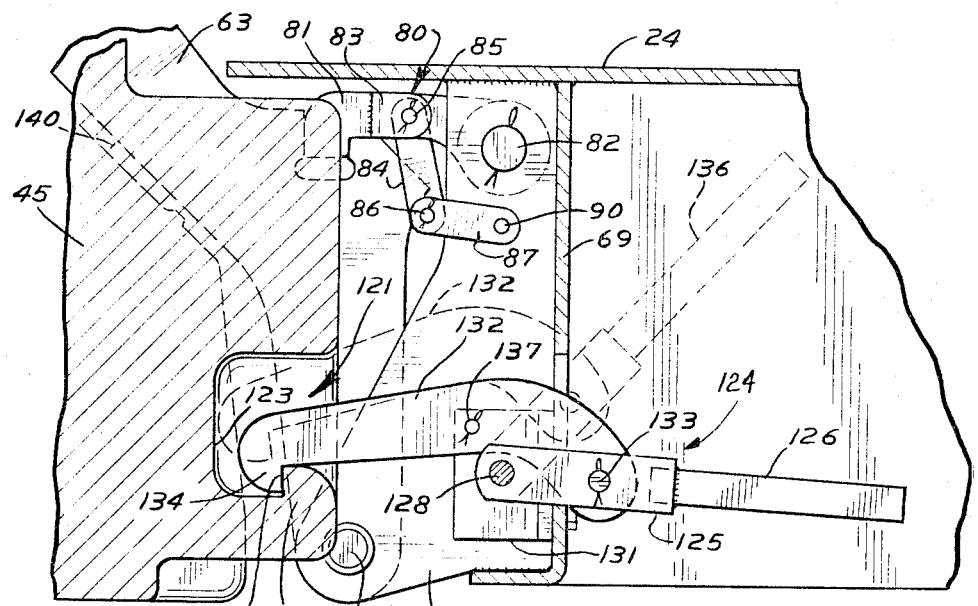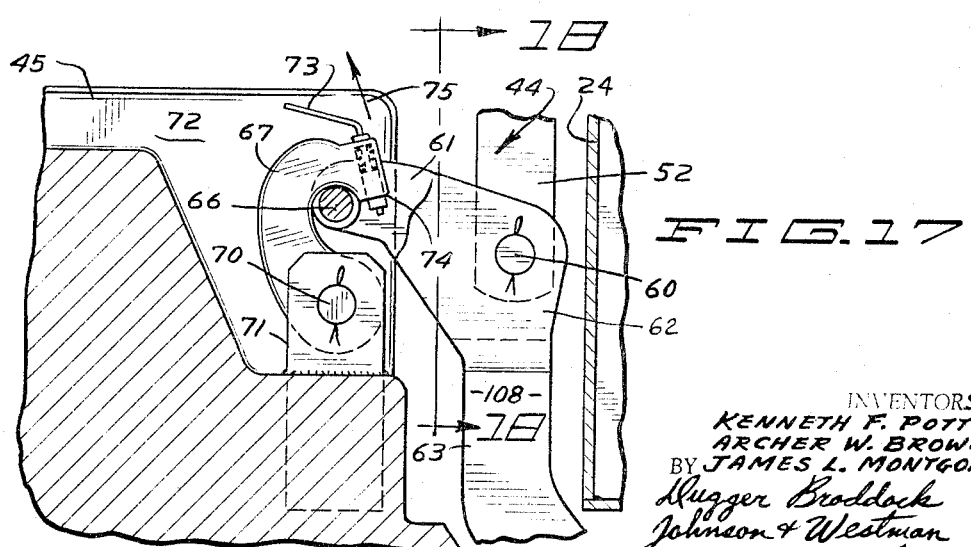

United States Patent Office 3,278,045
Patented Oct. 11, 1966

3,278,045
COUNTERWEIGHT SUPPORT MECHANISM
Kenneth F. Potter, St. Paul, Archer W. Brown, Minneapolis, and James L. Montgomery, St. Paul, Minn., assignors to American Hoist & Derrick Company, St. Paul, Minn., a corporation of Delaware
Filed Mar. 9, 1964, Ser. No. 350,213
10 Claims. (Cl. 212—49)

The present invention has relation to a mechanism for support of the counterweight on a mobile crane and more particularly to a mechanism with which the time necessary for removal and remounting of the counterweight is drastically reduced.

The present invention represents certain improvements over the structure shown in Patent No. 2,689,655 and is designed to drastically reduce the amount of time necessary for operators to remove and remount the counterweight on the back of a mobile crane.

Truck mounted cranes, in particular, as well as crawler cranes, are very often moved from job to job. Each time the unit is moved the counterweight must be removed in order to obtain proper weight distribution for over the road travel. In certain cases because of load restrictions the counterweight is carried on a separate truck. The counterweight, of course, is necessary in all operations if the crane is going to lift a significant load. The counterweight mounts at the rear of the crane base or platform of the crane and counter balances the load reaction from the boom hoist mechanism.

The device of the present invention presents structure whereby the counterweight is mounted onto arms which are pivoted to the base or frame of the crane. The arms will pivot from a raised position with the counterweight in operational position to a lowered position wherein the counterweight can be supported independently and removed from the arms. The movement of the arms is controlled by the boom hoist controls acting through struts at the rear of the crane, which are attached to a mast carrying the rear or lower hoist cable bail.

The arms supporting the counterweight are securely latched and locked with the counterweight in its usable position and the arms will not come loose during operation. Hooks are used to attach the counterweight to the support arms.

When the counterweight is to be picked up and remounted the arms can easily attach to the weight without precision alignment, as was necessary previously.

The method of raising and lowering the counterweight will be discussed more fully as the description proceeds.

With the structure of the present invention it has been found that the counterweight can be removed in about five minutes time as compared to approximately one half hour or more to remove the counterweight in the manner disclosed in Patent No. 2,689,655. The percentage of productive time of mobile cranes is increased tremendously.

It is an object of the present invention to present an improved counterweight support mechanism which reduces the time necessary for removal and replacement of the counterweight on mobile cranes.

In the drawings:

FIG. 1 is a side elevational view of a truck mounted crane having a counterweight installed thereon and shown with the boom in an initial position necessary for removal of the counterweight;

FIG. 2 is a side elevational view of the device of FIG. 1 showing the counterweight resting upon blocks on the ground;

FIG. 3 is a side elevational view of the device of FIG. 1 showing a further step in the removal of the counterweight, with the boom in its support cradle on the truck to permit support arms to be detached from the counterweight;

FIG. 4 is a side elevational view of the device of FIG. 1 showing the truck crane with the counterweight removed, and with the counterweight support mechanism in transport position;

FIG. 5 is an enlarged end elevational view of a truck crane having a counterweight support mechanism made according to the present invention and taken as on line 5—5 in FIG. 3;

FIG. 6 is a side elevational view of the device of FIG. 5 showing a counterweight attached to counterweight support arms, prior to being raised into working position;

FIG. 7 is a side elevational view of the device of FIG. 5 showing the counterweight in its working position;

FIG. 8 is a fragmentary section view taken as on line 8—8 in FIG. 5 and showing counterweight support arms as they move toward latched position;

FIG. 9 is a sectional view taken as on the same line as FIG. 8 and showing counterweight support arms in latched position, with the latch mechanism set so that the counterweight can be released and removed;

FIG. 10 is a fragmentary sectional view taken as on line 10—10 in FIG. 8;

FIG. 11 is a fragmentary sectional view taken as on line 11—11 in FIG. 9;

FIG. 15 is a fragmentary sectional view taken as on line 15—15 in FIG. 7;

FIG. 16 is a sectional view taken as on line 16—16 in FIG. 15;

FIG. 17 is a sectional view taken as on line 17—17 in FIG. 5; and

FIG. 18 is a fragmentary sectional view taken on line 18—18 in FIG. 17.

*General structure*

Figure 12:
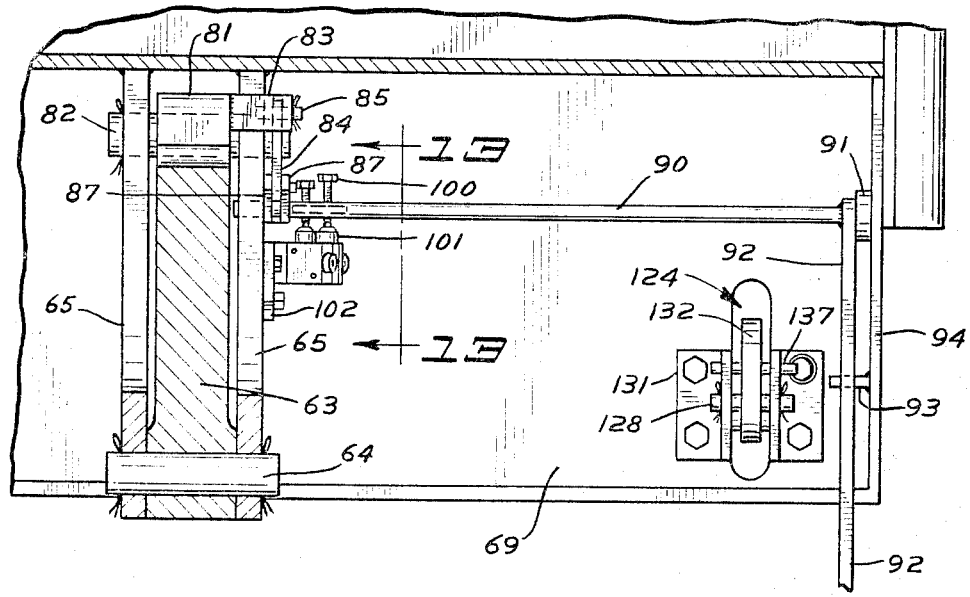
FIG. 12 is a fragmentary sectional view taken as on line 12—12 in FIG. 9.

Referring to the drawings, and in particular, FIGS. 1–4 which illustrates a mobile crane 20, as shown mounted onto a truck 19 having a frame 21 which in turn is supported on wheels 22 for movement along the ground 23. The truck is powered in a usual manner and it is to be understood that while a truck is used for purposes of illustration the crane could be mounted onto a crawler frame or to any desired platform.

A crane platform or base 24 is rotatably mounted through conventional rotating mechanism 25 to the truck body. The platform 24 forms the base for the crane and for a cab 26 in which an operator can sit to operate the crane. The controls and drives are mounted in the cab.

A boom assembly 27 is pivotally mounted as at 30 to brackets 31, which in turn are attached to the base 24.

The movement of the boom 27 about its pivot 30 is controlled from a suitably powered hoist drum 32 mounted in a usual or preferred manner within the cab 26 and which controls a cable 34 extending up through a rear or lower boom control bail 33 containing suitable sheaves. The cable 34 is reeved between bail 33 and an upper or forward bail 35, which in turn is attached to boom pendants 36 that are connected directly to the outer end of the boom.

The bail 33 is supported by an A frame or mast assembly 37 that is pivotally supported as at 38 to the top of the cab of the crane. The mast assembly is further supported by a pair of struts 44, 44 which are attached through counterweight support arms 63 to the rear of the crane base.

The mechanism for controlling the boom is conventional and is substantially the same as that shown in Patent No. 2,869,655 with the exception that in the present structure the rear or inner bail 33 is supported directly at the upper end of the mast assembly 37 while in Patent No. 2,689,655 the inner bail is supported through arms attached to the upper end of the mast. By reeving in or paying out cable 34 from the drum 32 the boom can be raised or lowered about its pivot.

A conventional load hook 40 is supported at the outer end of the boom 27 and is controlled through cables 41 which in turn are mounted over a hoist drum 42 that is controlled by the operator within the cab. This load hoist structure also is a conventional part of existing cranes and forms no part of the present invention. If desired, suitable outriggers, of conventional design, such as those illustrated at 43, can be provided on the truck frame to support the rear of the truck during the removal of counterweight 45, which is supported on the base 24 through the support arms 63.

Rear strut assembly construction

Referring specifically to FIGS. 5, 6 and 7 the counterweight 45 is shown resting on support blocks 46, and the strut assemblies 44 and arms 63 are in a lowered position. The strut assemblies 44, as shown, are spaced apart and are pivotally mounted at the upper ends thereof to the mast assembly 37 with a shaft 47. The inner bail 33 for the cable 34 is also mounted onto the shaft 47.

The strut assemblies 44 are each made in three sections, a top section 50, a center section 51, and a lower section 52, as shown, so that they will telescope from an elongated condition shown in FIGS. 1 and 5 to a shortened or compressed position as shown in FIG. 4. This shortened position of the struts is also shown in dotted lines in FIG. 7. In order to accomplish the telescoping, in each of the struts (which are identically constructed) the top section 50 is slidably mounted in a suitable bracket 53 that is fixed to the center section 51. The top section 50 is a single bar. The center section 51 is comprised as two spaced bars that are slidably mounted with respect to the lower section 52 and fit on the outside of the lower section. The lower section is also comprised as two spaced bars. The top section will slide between the bars of the lower section. An upper pin 54 is used to pin the top section 50 to the center section 51, as shown in FIG. 5, when the struts are extended. A lower pin 55 is used to pin the lower section 52 to the center section 51 with the struts in their extended condition.

A pair of brackets 56 are welded to the bars of the center section to form a square tubular portion for guiding the lower section 52 with respect to the center section 51. The bars of the lower section 52 have a pair of brackets 57 welded thereto which have edge portions extending to slidably guide the bars forming the center section. As shown, the bars of the lower section fit between the bars of the center section. When the strut is extended the brackets 56 and 57 abut against each other.

When the strut unit is to be telescoped or compressed to position as shown in dotted lines in FIG. 7, pins 54 and 55 are removed. Top section 50 is slid downwardly until the hole in the lower end of top section 50 aligns with a provided hole 58 in the lower section. (See FIGS. 6 and 7.) The top section 50 slides between the bars forming the lower section. At the same time the center and lower sections slide with respect to each other until the holes in the top of the lower section, the top of the center section and hole 59 in the top section all align. Pin 54 is inserted through these holes. The holes in the bottom of the center section will then be aligned with hole 58 and pin 55 is inserted through these aligning holes.

Stop brackets 68 are provided to properly position the strut sections in their compressed condition. Brackets 56 will strike stop brackets 68 and brackets 57 will strike brackets 53.

With the struts in their compressed condition the mast assembly 37 will move to position as shown in dotted lines in FIG. 7 so that the overhead clearance of the unit is substantially reduced.

Counterweight support arms

The lower end of each strut assembly 44 is pivotally mounted as at 60 between a pair of spaced apart walls 61 and 62 formed in each support arm 63, 63. The construction of each of the support arms is identical.

Each of the arms 63 is pivotally mounted as at 64 between a separate pair of brackets 65, 65 which are spaced apart and are fixedly attached to a vertical plate 69 which forms part of the base 24 of the crane. The outer end portion of each of the arms 63, as stated previously, has a pair of spaced apart side walls 61 and 62. A support pin 66 is cast integral between each pair of side walls 61 and 62 and, as perhaps best seen in FIG. 17, each of the pins 66 supports a hook 67 thereon. Each of the hooks 67 (there is one for each arm) is pivotally mounted onto a pin 70 which extends between a separate pair of brackets 71, 71 cast into the counterweight 45. A pair of receptacles indicated at 72, 72 are formed in the counterweight. One receptacle aligns with and is of size to receive the outer end of one of the arms 63 and its associated brackets and hook.

The hooks 67 each have a safety plunger pin 73 which is spring loaded and extends outwardly beyond the end surface 74 of the bight portion of the hook. The plunger constricts the normal openings of the hooks to prevent them from coming off the pins 66. The safety plunger can be moved in direction as indicated by arrow 75 to enable an operator to easily remove the hook from its pin 66 after the counterweight is set upon the blocks 46 and the hooks are loose. The safety plunger 73 will automatically return to extended position to prevent accidental dislodging of the hooks from the support pins 66.

When the hooks 67 are in place on the pins 66 of the arms 63, the counterweight is ready to be hoisted into its working position. As shown in FIG. 2, the load hook 40 of the crane can be attached to a chain 76 which in turn is fastened to a front portion 77 of the truck frame 21 and the drum 42 will be held or set. Boom control drum 32 can be operated to tighten cable 34. This will exert a force between the inner and outer bails 33 and 35. Inasmuch as the boom is pinned to the truck, instead of moving the boom about its pivot the reaction of the force tends to move the mast assembly 37 about its pivot 38. This will cause an upward lifting of the strut assemblies in direction as indicated by arrow 78 in FIG. 6. When the force acting upwardly on the struts is great enough the arms 63 will move about their pivots 64 and the counterweight will be lifted.

When the counterweight is properly positioned the arms 63 will be latched in place.

Arm latching mechanisms

Each of the arms 63 has a separate latching mechanism. The latching mechanisms are identical in construction and operation except that one extends to the right hand side of the machine and the other extends to the left hand side of the machine. The parts on the latching mtechanisms will be identically numbered. FIGS. 8 through 12 illustrate the right hand latching mechanism which will be explained in detail.

A separate latch dog assembly 80 is pivotally mounted between each pair of brackets 65, 65 about an axis spaced above pivot 64 for the arms 63. Each latch dog assembly 80 includes a latch dog 81 that is pivoted on a pin 82 extending between the brackets 65, 65. Each latch dog 81 has a lug 83 integral therewith that extends outwardly therefrom toward the outside of the crane. A separate pull link 84 is pivotally mounted with a pin 85 to each lug 83 and the link extends downwardly therefrom.

Each pull link 84 is pivotally mounted at a second end thereof to a separate pin 86 that in turn is pivotally mounted between a pair of torque arms 87, 87. The torque arms 87, 87 are fixedly attached, as by welding, to a separate torsion rod or bar 90. The torsion rod or bar 90 extends transversely to the crane toward the nearest side edge thereof. Each of the torsion rods 90 is rotatably mounted at a first end thereof in one of the brackets 65, as typically shown in FIG. 12, and the second end thereof is rotatably mounted in a suitable collar 91 adjacent the outer edge of the base 24. A control lever 92 is fixedly attached to each of the torsion rods adjacent the second ends thereof. Each of the control levers is positioned in a predetermined angular relationship with respect to its corresponding torque arms 87, 87. Each lever 92 cooperates with a separate latching or locking bracket 93 which is welded to one of a pair of end members 94, 94 which in turn are fixedly attached to the vertical plate 69 of base 24. Each latching bracket 93 as a first notch 95 defined therein which is of size to receive a portion of its associated lever 92 with the lever in a locked position. Each bracket 93 also has a second notch 96 defined therein which receives a portion of the lever 92 and hold the lever in a released or unlocked position.

A switch actuating plate 97 is welded to the torsion bar 90 and extends parallel to the axis thereof. The actuating plate has a first cap screw 100 threadably mounted therethrough and positioned to contact a first microswitch 101 which in turn is mounted with a bracket 102 to the adjacent arm mounting bracket 65. Suitable cap screws 103 can be used for mounting the bracket 102. A stop nut, as shown, can be used for locking the first cap screw 100 in position. A second cap screw 104 is also threadably mounted through actuating plate 97 and is positioned to contact a second microswitch 105 which is also mounted onto the brackets 102. The function and operation of the microswitches will be explained later.

When the counterweight is to be moved into place, the control levers 92 are moved to notches 95, which is their locked position. This rotates torsion shafts 90 and causes the arms 87, 87 to be pulled downwardly and, consequently, pull the latch dogs 81 downwardly.

As can perhaps best be seen in FIGS. 6 and 7, the counterweight support arms 63 are each offset. Each of the counterweight support arms has a base leg 106, an offset section 107 and an upper leg 108. The offset is to enable the arms to be mounted directly to the base 24 and still clear the rear portions of the cab 26 when the arms are in their locked working position. The offset section 107 of each of the arms has an inclined edge ramp surface 111 facing the latch dog 81 with which it is associated. In addition, the offset sections of each of the legs has a latching notch 112 provided therein. The latching notches are defined at their front edges by machined latching surfaces 113. The inclined ramp surfaces 111 join the aligned latching surfaces 113.

As the counterweight is lifted through the use of the boom control cable, as previously explained, each of the inclined ramp sufaces 111 will strike the forward edge of the latch dog 81 with which it is aligned. Inasmuch as the latch dogs are moved by placing the control lever 92 into notch 95, in order for the latch dogs to slide along the inclined ramp surfaces the torsion bar 90 must resiliently yield to permit the latch dogs to rise. As the support arms 63 progress toward their position as shown in dotted lines at 114 in FIG. 8, the latch dogs will continue to slide upwardly and the torsion bar will yield.

When the arms move sufficiently far in direction as indicated by arrow 115, the latch dogs will enter latching notches 112 and the resilient urging of the torsion bars 90 will cause the latch dogs to snap into the notches. The latching surfaces 113 will contact the mating machined surfaces 116 on the latch dogs. The torsion bars will be under sufficient stress to continue to urge the latching dogs into the notches.

Over center binders for securing counterweight

Once both of the arms 63 have been latched into position as explained, the control levers 92 are left in the locking notches 95. The counterweight is then further tightened to prevent it from shifting when the crane is being used. In order to accomplish this, over center binders are used adjacent each side of the counterweight. The structure of the over center binders is perhaps best seen in FIGS. 12, 15 and 16.

Adjacent each side of the counterweight there is a pocket 120 which has a large front opening 121 and has a lug 122 at the bottom portion thereof. The lug 122 is spaced from the back wall 123 of the pocket.

Adjacent each end of the rear vertical plate 69 a separate over center binder assembly 124 is mounted. The over center binder assemblies are identical and each consists of an actuating lever assembly 125, which has a handle 126 and a pair of spaced apart legs 127, 127. The legs 127, 127 are pivotally mounted with a pin 128 to a pair of spaced apart brackets 131, 131 which in turn are bolted to the back plate 69 of the base 24.

A latch member 132 is pivotally mounted with a pin 133 between the legs 127, 127. The pivotal aris of pin 133 is spaced from the pivotal axis of pin 128 on each binder assembly. The latch members 132 are elongated flat members and each has a hook portion 134 at an outer end thereof. Each hook portion 134 is of size to fit within the opening 121 of its aligned pocket 120 and the hook portion 134 will drop over the aligned lug 122 so that a hooking surface 135 thereof will engage the lug 122. In order to insert the hook portion 134 into pocket 120 the handle assembly 125 must be moved to position as shown in dotted lines at 136 in FIG. 16. The handle member 125 is then pulled downwardly until the axis of pin 133 goes over center with respect to the axis of pin 128 and the effective point of application of force between surface 135 and lug 122.

As the binders are forced over center the counterweight will contact a pair of reslient pads 140 which are adhesively applied to the counterweight in position aligned with the support arms, as shown in FIG. 9. Each of the pads on counterweight will contact the aligned arm and compress the pads 140. The pads 140 are resilient enough to permit the over center binders to snap into locked position. The binders will hold the counterweight tightly to prevent side sway of the counterweight.

A safety latch pin 137 can be utilized to lock the over center binders in position. The pin 137 is placed through provided holes in brackets 131 and latch members 132. The latch members cannot be moved with the pins 137 in place.

Operation

The removal of the counterweight from the crane is shown in step by step progression in FIGS. 1–4. When the counterweight is to be removed the truck is placed in a desired location so that the counterweight can be dropped onto supporting blocks 46. Next, the boom is moved to position as shown in FIG. 1 through the operation of the boom control drum 32, and the load hook 40 is hooked onto the chain 76, which in turn is fastened to the front portion 77 of the frame of the truck. The drum 42 operating the load hook is then set and held immobile. The over center binders 124 are released, or in other words moved to position as shown in the dotted lines at 136 and the control levers 92 on each side of the crane are moved into notches 96. Because the counterweight is supported by the arms, the surfaces 116 on the latch dogs and 113 on the latch notches are contracting and under pressure. The force exerted by the torsion bars 90 on the latch dogs 81 due to the movement of levers 92 to notches 96 is not sufficient to overcome the friction between surfaces 116 and 113 the latch dogs will not be released.

This is a safety feature, and the dogs will remain engaged within their latch openings until the weight of the counterweight has been relieved on the latches. The position of the control levers 92 and the latch dogs 81 is as shown in FIG. 9. The torsion bars 90 are resiliently urging the latch dogs out of their notches but the weight on the dogs prevents the dogs from releasing the arms.

The hoist drum 32 is then operated to tighten cable 34 in an attempt to lift the boom 27. Inasmuch as the boom is hooked to the front portion of the truck the force from the tightening of the cables is transmitted through struts 44 and arms 63 to the counterweight 45, as the mast assembly 37 tends to move about its pivot. When sufficient force is transmitted, the counterweight will be raised slightly, thereby relieving the load on latch dogs 81 and allowing them to spring upwardly under the urging of torsion bars 90 to position as shown in dotted lines at 141 in FIG. 9.

After the latch dogs are released the boom hoisting drum 32 is then operated so that cable 34 is payed out. As the cable 34 lengthens the mast 37 and strut 44 will move to position as shown in FIG. 2. The arms 63 will pivot about pivots 64 and the counterweight will be moved downwardly and outwardly away from the crane base.

Once the counterweight is resting on its support blocks 46 the hoist cable is payed out to slacken hoist line 41 and the boom load hook 40 is released from chain 76. The boom cable 34 is further extended. This will allow the boom to lower and come to rest on a standard provided support rest on the truck, as shown in FIG. 3. Cable 34 is payed out until it is slack. This will remove any load on counterweight support hooks 67. The safety plungers 73 are then pulled upwardly and the hooks are lifted from pins 66 on the arms 63. The counterweight is no longer attached to the crane. The arms 63 are then raised to their latched position by tightening cable 34. The counterweight remains on its support on the ground. Then, in order to place the crane into transport position with the mast lowered, the pins 54 and 55 in the struts 44 are removed from the struts. The struts are then slidably compressed and the pins 54 and 55 are reinserted into their proper holes to hold the struts in their compressed position with the arms 63 in their latched position. The position of the mast and the struts in compressed position is shown in dotted lines in FIG. 7.

If desired, the struts 44 can be left in their extended position so that the crane boom can be operated and used to lift and move the counterweight to any desired location. This operation of the boom to lift the counterweight is more fully explained and shown in Patent No. 2,689,655. It should be understood that the same mast assembly as shown in Patent No. 2,689,655 can also be utilized in this crane, if desired.

When the counterweight is to be replaced onto the crane the reverse of the operations is necessary. The struts are extended and the arms 63 lowered. The crane is positioned adjacent the counterweight. The fact that the individual arms 63 can be moved slightly independently of one another, and also that the hooks 67 can be independently moved makes it very easy to attach the arms to a counterweight resting on support blocks. Once the hooks 67 are attached to the arms 63, control levers 92 will be moved to their notches 95. The counterweight is lifted into position by operating the hoist drum to tighten cable 34 with the boom locked down to the truck frame. The reaction will lift the struts and arms together with the counterweight. The dogs will snap into their provided latch receptacles and the over center binders will again be clamped down to hold the counterweight firmly against the resilient pads. 140.

*Safety indicator lights*

One of the important features is that the strut assemblies 44 never have to be disconnected from the arms 63 to which they are mounted. The struts can be easily elongated to compressed, as desired.

Figure 13:
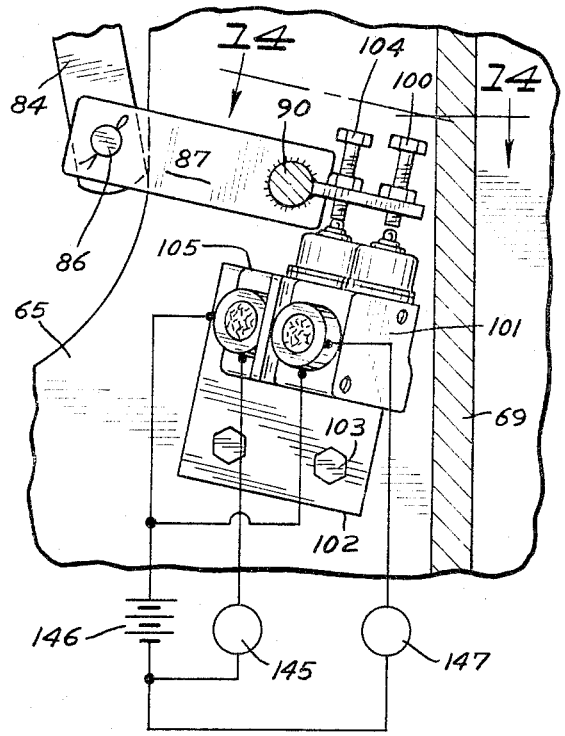
FIG. 13 is a sectional view taken as on line 13—13 in FIG. 12.
Figure 14:
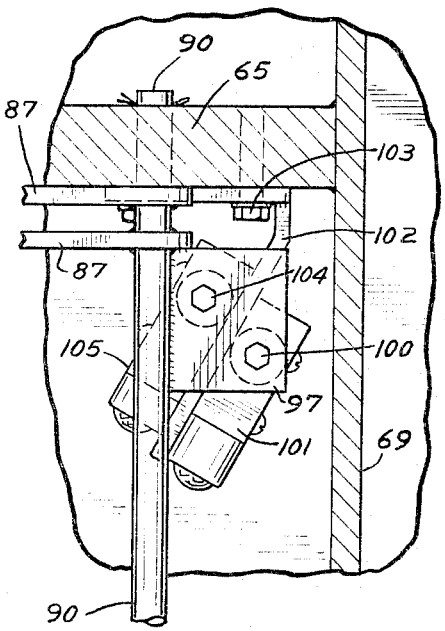
FIG. 14 is a sectional view taken as on line 14—14 in FIG. 13.

In order for the operator in a cab to have full knowledge of the position of the control levers 92, microswitches 101 and 105 and their associated actuating plates and cap screws are used. Each latching mechanism has a separate set of indicator lights. Microswitches are electrically connected to suitable indicator lights within the operator cab as shown as schematically in FIG. 13. Microswitch 105 is a normally closed microswitch and operates a green indicator lamp 145. The lamp 145 is connected to a suitable source of electromotive force 146. The cap screw 104 is adjusted carefully so that with the latch lever 92 in notch 95 (its lock position) and with the latch dog 81 fully seated so that the surface 113 and 116 mate fully, the green light is on. The movement of the control lever 92 to notch 96 will be sufficient to deflect the actuator plate 97 sufficiently to open microswitch 105 and turn the green indicator light off. The green light will go off even if the latch dog remains in the notch 112. The slight movement of the torsion bar will cause the light to go off. This will tell the operator immediately that one of the control levers 92 is not in locked position.

Microswitch 101 is a normally open microswitch and operates and controls a red indicator lamp 147. The red indicator lamp 147 is also connected through a source of electromotive force 146. Cap screw 100, which aligns with the actuating button of microswitch 101 is adjusted so that when its associated latch dog raises upwardly a sufficient distance to clear surface 113 of its respective arm the associated red light will come on and inform the operator that the latch dog on that side is not in locked position. The only time that operation is indicated as being safe is when the green lights are on, which means the latch dogs are in their notches and the lock levers are in their lock notches 95.

It is apparent that the green lights will be illuminated with the support arms in their down position and the lock levers in notches 95. When the counterweight is raised the green light will go off as soon as the latch dogs slide up surface 111. The red lights will come on when the latch dogs reach the top of surface 111 and then the green lights will come on again when the latch dogs seat in their notches.

What is claimed is:

1. In a mobile crane having a base, hoist mechanism on said base, and a counter balancing load unit on said base positioned to balance load lifted by said hoist mechanism, the improvement comprising means for supporting said counter balancing load unit on said base including at least one support arm pivotally mounted to said base, means for attaching said conuter balancing load unit to an outer portion of said support arm, power means attached to said support arm to move said arm between a raised and a lowered position, releasable latch means for locking said arm in a raised position, said latch means including a latch dog pivotally mounted to said base and aligned with said support arm, said support arm having a latch notch provided therein in position to align with and receive said latch dog with said arm in said raised position, biasing means urging said latch dog in direction to become fully engaged with its provided latch notch, said biasing means comprised as a torsion bar rotatably mounted about an axis substantially parallel to the pivotal axis of said latch dog, a torque arm fixedly attached to said torsion bar adjacent said latch dog, means pivotally linking said torque arm to said latch dog, a control lever fixed on a portion of said torsion bar spaced from said torque arm, and a positioning member connected to said base, said control lever being movable to a first position with respect to said positioning member wherein said latch dog is urged by said torsion bar in direction toward a fully seated position in its latch notch, said control lever being movable to a second position with respect to said positioning member wherein said control lever will cause said torsion bar to resiliently urge said latch dog to position wherein it clears the surfaces defining its latch notch.

2. In a mobile vehicle of the type having a base, a working element pivotally mounted adjacent one end of said base, power hoist means for operating said working element to support working loads, and a balancing load unit positioned on the opposite end of said base, the improvement comprising means for attaching said balancing load unit to said base including at least one arm pivotally mounted at an inner end thereof on said base, means connecting said arm to said power hoist means and operable to move said arm between a raised and a lowered position, releasable latch means for holding said arm in said raised position, means for attaching said balancing load unit to the outer end of said arm, the pivot point of said arm being below the point of attachment of said balancing load unit with said arm when said arm is in its raised position, and a pair of overcenter binder assemblies monuted at opposite edges of said base and having hook members adapted to engage aligning portions of said balancing load unit and being movable to a locked position to hold said balancing load unit securely with respect to said base.

3. In a mobile crane having a base, a boom pivotally mounted at a front edge of said base, hoist means on said base for controlling movement of said boom about its pivot and a counterweight supported at the rear of said base, the improvement comprising counterweight supporting mechanism, said mechanism including a pair of support arms pivotally mounted to said base adjacent the lower edge thereof, means connected between said boom hoist means and said arms for transferring the rotary action from said boom hoist means to said arms, said arms being movable between a raised position with the outer ends thereof above their pivots and a lowered position, means for releasably attaching said counterweight on the outer ends of said arms, releasable latch means for holding said arms in said raised position, said latch means including a latch dog pivotally mounted to said base, each of said support arms having a latch notch provided therein in position to align with and receive one of said latch dogs with said arms in said raised position, separate bias means urging each of said latch dogs in direction to become fully engaged with its provided latch notch, said separate bias means each comprised as a torsion bar rotatably mounted about an axis substantially parallel to the pivotal axis of said latch dogs, a torque arm fixedly attached to said torsion bar adjacent its corresponding latch dog, means pivotally linking said torque arm to said latch dog, a control lever fixed on a portion of said torsion bar spaced from said torque arm, said control lever being movable to a locked position wherein its corresponding latch dog is urged by said torsion bar toward a fully seated position in its aligned notch, and lock means to releasably hold said control lever in its locked position.

4. The combination as specified in claim 3 therein each of said arms is provided with a ramp surface joining the surfaces defining the latching notch therein, said ramp surface being aligned with its respective latching dog, said latching dog being positioned to engage and slide along said ramp surface as said arms move toward said raised position with its control lever in locked position.

5. In a mobile crane having a base, a boom pivotally mounted at a front edge of said base, hoist means on said base for controlling movement of said boom about said pivot and a counterweight supported at the rear of said base, the improvement comprising a counterweight supporting mechanism, said mechanism including a pair of spaced support arms each independently pivotally mounted at inner ends thereof about substantially the same axis to said base adjacent the lower edge of said base, said boom hoist means including a mast pivotally mounted to said base about an axis spaced at a substantial distance above the pivotal axis of said support arms and extending rearwardly and upwardly, said mast having means at the upper end thereof to receive and carry the reaction of load from the boom, a pair of struts each pivotally mounted at a first end thereof to the upper end of said mast and each being pivotally mounted at a second end thereof to one of said support arms in spaced relation to the pivotal axis of said support arms, said support arms being movable under control of said boom hoist means between a raised position with the outer ends thereof above their pivots and a lowered position with the outer ends thereof below their pivots, means for attaching said counterweight on the outer ends of said arms, releasable latch means for holding said arms in said raised position, said latch means for each of said arms including a separate latch dog pivotally mounted to said base and aligned with one support arm, each of said support arms having a latch notch provided therein in position to align with and receive one of said latch dogs with said arms in said raised position, and separate biasing means urging each of said latch dogs in direction to become fully engaged with its provided latch notch.

6. The combination as specified in claim 5 wherein said separate bias means for urging said latch dogs toward their seated position in their latching notches are each comprised as a torsion bar rotatably mounted about an axis substantially parallel to the pivotal axis of said latch dogs, a torque arm fixedly attached to said torsion bar adjacent its corresponding latch dog, means pivotally linking said torque arm to said latch dog, a control lever fixed on a portion of said torsion bar spaced from said torque arm, and positioning means for said control lever, said control lever being movable to a first position with respect to said positioning means wherein its corresponding latch dog is urged by said torsion bar in direction toward a fully seated position in its aligned notch, said control lever being movable to a second position with respect to said positioning means wherein said control lever will cause its attached torsion bar to resiliently urge its corresponding latch dog to position wherein it clears the surfaces defining its latch notch.

7. The combination as specified in claim 6 wherein each of said arms is provided with a ramp surface joining the surfaces defining the latching notch therein, said inclined surfaces being aligned with their respective latching dogs, said dogs engaging said ramp surfaces as said arms move toward said raised position with the control lever in it first position, and said latch dogs sliding along said ramp surfaces against the action of said bias means as said arms move toward their latched position.

8. The combination as specified in claim 6 and a pair of indicator lights for each latch dog, separate switch means for controlling each indicator light, actuating means on each of said torsion bars for controlling said switches, said actuating means being movable to move a first switch of each pair of switches to position wherein its corresponding indicator light is on when said control lever is in its first position and the corresponding latch dog is in its latched position, said actuating means moving said first switch ot position wherein said light is off both whenever the control lever is not in its first position and whenever its latch dog is not in latched position, and said actuating means moving a second switch of each pair of switches to position wherein its corresponding indicator light is on whenever its corresponding latch dog is out of its latched position.

9. The combination as specified in claim 6 and an indicator light for each latch dog, separate switch means for controlling each indicator light, and actuating means on each of said torsion bars for controlling said switches, said actuating means being movable to move said switch to position wherein said indicator light is on when said control lever is in its first position and the corresponding latch dog is in its latched position, said actuating means moving said switch to position wherein said light is off whenever the control lever is not in its first position.

10. The combination as specified in claim 9 wherein each actuating means moves its switch to position wherein its light is off whenever its latch dog moves out of its latched position.

References Cited by the Examiner

UNITED STATES PATENTS

| | | | |
|---|---|---|---|
| 168,677 | 10/1875 | Simpson | 292—66 |
| 1,585,314 | 5/1926 | Pericle | 292—106 |
| 1,812,762 | 6/1931 | Steventon et al. | 292—97 X |
| 2,130,487 | 9/1938 | Foley | 212—49 |
| 2,325,089 | 7/1943 | Zeilmon | 212—49 |
| 2,541,970 | 2/1951 | Pospisil | 254—139.1 |
| 2,611,580 | 9/1952 | Troche et al. | 254—139.1 |
| 2,674,378 | 4/1954 | Meyer et al. | 212—49 |
| 2,689,655 | 9/1954 | Potter et al. | 212—59 |
| 3,071,254 | 1/1963 | Stilley | 212—49 X |

FOREIGN PATENTS 622,197   10/1935   Germany.

EVON C. BLUNK, *Primary Examiner.*

SAMUEL F. COLEMAN, *Examiner.*

A. L. LEVINE, A. H. NIELSON, *Assistant Examiners.*